Patented July 2, 1935

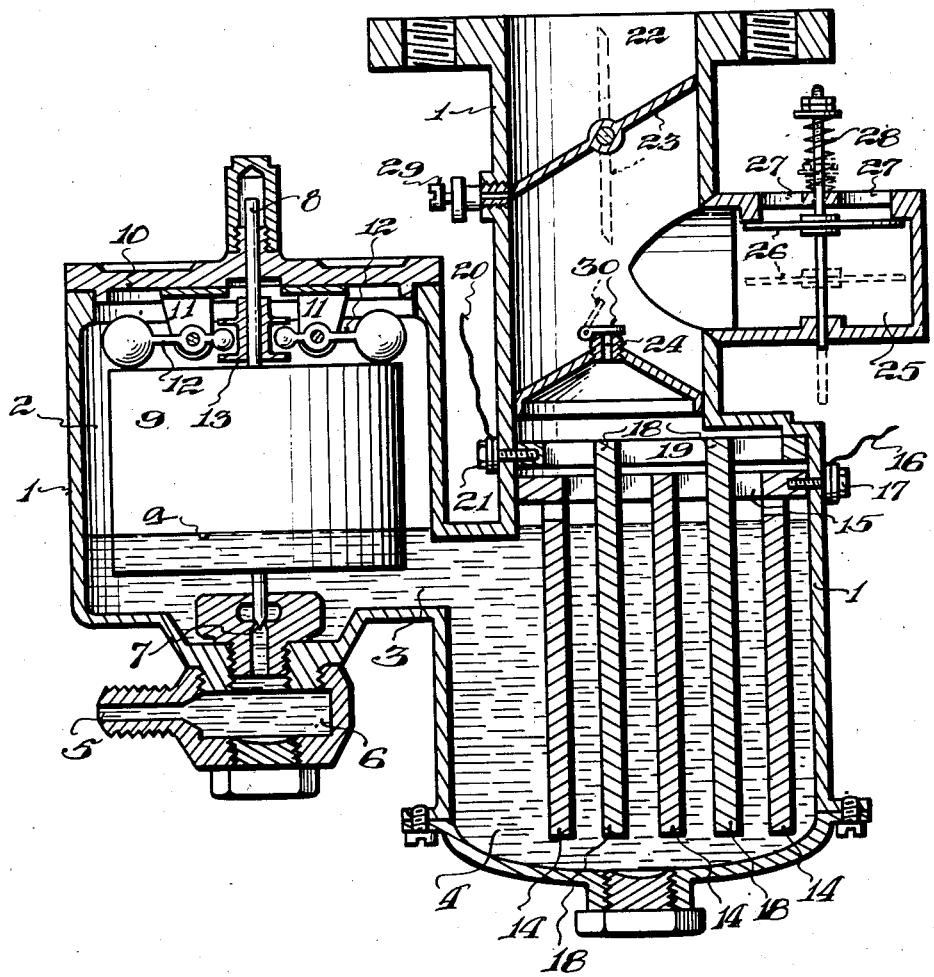

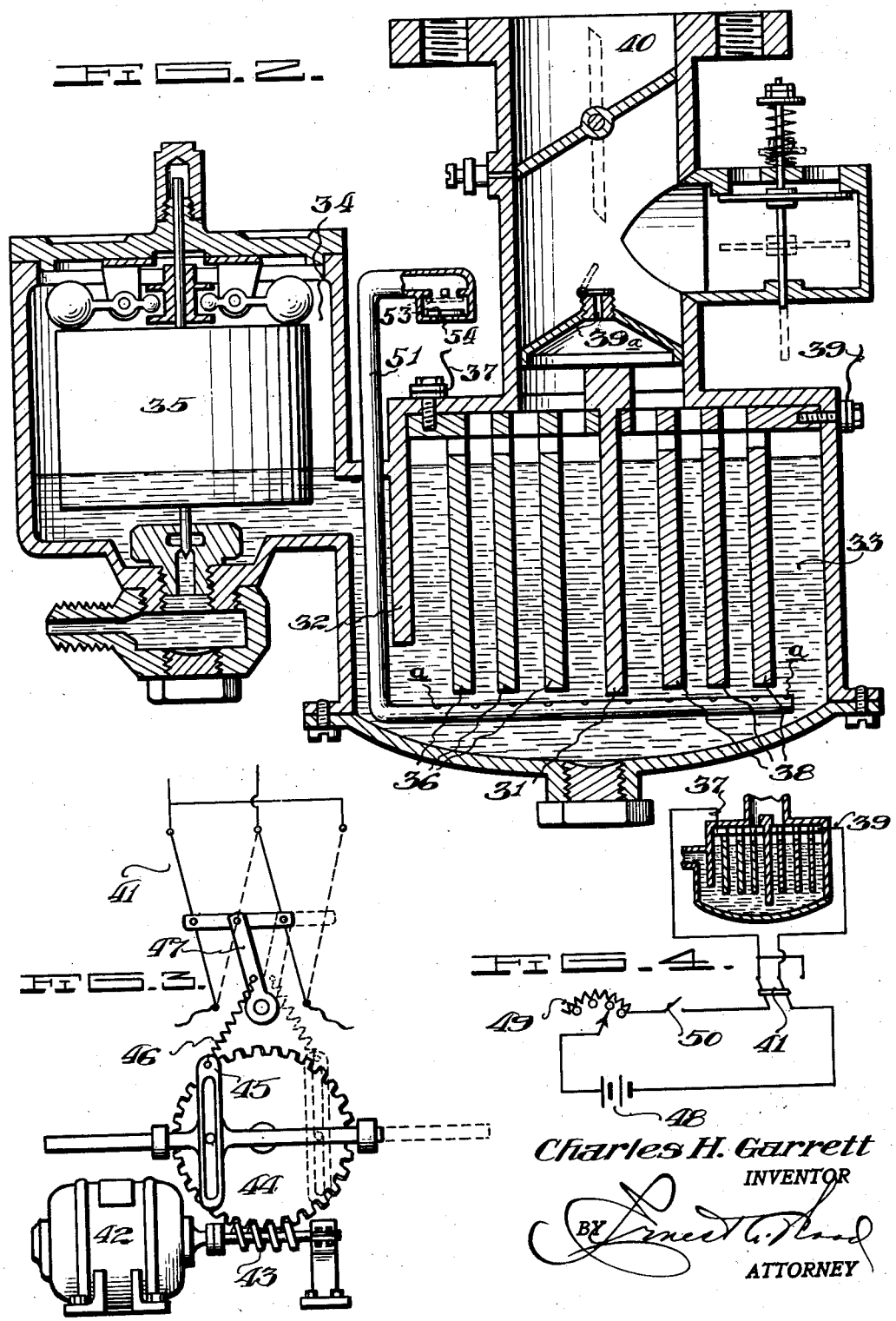

2,006,676

UNITED STATES PATENT OFFICE 2,006,676

ELECTROLYTIC CARBURETOR

Charles H. Garrett, Dallas, Tex.

Application July 1, 1932, Serial No. 620,364
Renewed November 30, 1934

5 Claims. (Cl. 204—5)

This invention relates to carburetors and it has particular reference to an electrolytic carburetor by means of which water may be broken up into its hydrogen and oxygen constituents and the gases so formed suitably mixed with air.

The principal object of the invention is to provide in a device of the character described, a mechanism by means of which water may be readily decomposed into its constituents, and the constituents intimately mixed with each other and with air.

Another object of the invention is to provide means whereby the electrolyte level in the carburetor may be maintained at a more or less constant level regardless of fluctuations in fluid pressure at the fluid inlet of the carburetor.

Another object of the invention is to provide means whereby the relative amount of air mixed with the hydrogen and oxygen may be regulated as desired.

Still another object of the invention is the provision of means to prevent loss of hydrogen and oxygen gases during periods in which these gases are not being drawn from the carburetor.

Still another object of the invention is the provision of means whereby the hydrogen and oxygen resulting from electrolysis may be formed in separate compartments, and a further object of the invention is the provision of means to periodically reverse the direction of current flow and thereby alternate the evolution of the gases in the separate compartments, to be later intermingled.

With the foregoing objects as paramount, the invention has particular reference to its salient features of construction and arrangement of parts, taken in connection with the accompanying drawings, wherein:—

Figure 1 is a view in vertical section of one form of carburetor.

Figure 2 is a modified form.

Figure 3 is a diagrammatic view of a pole changer, showing its actuating mechanism, and Figure 4 is a wiring diagram for the modified form of carburetor shown in Figure 2.

Continuing more in detail with the drawings, reference is primarily directed to Figure 1 in which the reference numeral 1 designates the carburetor housing, which is preferably constructed of bakelite or other suitable insulating material. The housing 1 is so designed as to divide the carburetor into a float chamber 2 and gas generating chamber 4, connected by a fluid passage 3.

Water under pressure is forced into the carburetor through an opening 5 which communicates with the float chamber 2 through the medium of the sediment chamber 6 and the needle valve orifice 7, which is closed by a needle valve 8 when the device is not in operation. A float 9 surrounds the needle valve 8 and is free to move vertically relative thereto. Depending from the cover 10 to the float chamber 2 are two ears 11, located at spaced intervals on opposite sides of the needle valve 8. The members 12 are pivoted to the ears 11, as shown. The weighted outer ends of the members 12 rest on top of the float 9, and their inner ends are received in an annular groove in the collar 13 which is rigidly attached to the needle valve 8.

Within the gas generating chamber 4, a series of spaced, depending plates 14 are suspended from a horizontal member 15 to which a wire 16 has electrical contact through the medium of the bolt 17, which extends inwardly through the housing 1 and is threaded into the horizontal member 15.

A second series of plates 18 is located intermediate the plates 14 and attached to the horizontal member 19, and has electrical contact with the wire 20 through the bolt 21.

A gas passageway 22, in which a butterfly valve 23 is located, communicates with the gas generating chamber 4 through an orifice 24. An air inlet chamber 25 has communication with the gas passageway 22 above the orifice 24. A downwardly opening check valve 26 is in control of the openings 27, and is held inoperatively closed by means of light spring 28.

An adjustable auxiliary air valve 29 is provided in the wall of the gas passageway 22, which air valve is closed by the butterfly valve 23 when the butterfly valve is closed, but communicates with the outside air when the butterfly valve is open.

The operation of the device is as follows:

The chambers 2 and 4 are first filled to the level $a$ with a solution of weak sulphuric acid or other electrolyte not changed by the passage of current therethrough, and the opening 5 is connected to a tank of water, not shown.

The wire 16 is next connected to the positive pole of a storage battery or other source of direct current and the wire 20 to the negative pole. Since the solution within the carburetor is a conductor of electricity, current will flow therethrough and hydrogen will be given off from the negative or cathode plates 18 and oxygen from the positive or anode plates 14.

The butterfly valve 23 is opened and the gas passageway 22 brought into communication with a partial vacuum. Atmospheric pressure acting on the top of the check valve 26 causes it to be forced downwardly as shown in dotted lines. The hydrogen and oxygen liberated from the water at the plates 18 and 14 are drawn upwardly through the orifice 24 covered by the check valve 30 where they are subsequently mixed with air entering through the openings 27 and through the auxiliary air valve 29.

When it is desired to reduce the flow of hydrogen and oxygen from the plates 18 and 14, the current flowing through the device is reduced, and when the current is interrupted the flow ceases. When the butterfly valve 23 is moved to closed position, the check valve 26 is automatically closed by the spring 28. Any excess gas given off during these operations is stored in the space above the fluid where it is ready for subsequent use.

Water is converted into its gaseous constituents by the device herein described, but the dilute sulphuric acid or other suitable electrolyte in the carburetor remains unchanged, since it is not destroyed by electrolysis, and the parts in contact therewith are made of bakelite and lead or other material not attacked by the electrolyte.

The structure shown in Figure 2 is substantially the same as that shown in Figure 1 with the exception that the modified structure embraces a larger gas generating chamber which is divided by means of an insulating plate 31 and is further provided with a depending baffle plate 32 which separates the gas generating chamber 33 from the float chamber 34 in which the float 35 operates in the same manner as in Figure 1. Moreover, the structure shown in Figure 2 provides a series of spaced depending plates 36 which are electrically connected to the wire 37, and a second series of similar plates 38 which are electrically connected to the wire 39 and are spaced apart from the plates 36 by the insulating plate 31. Gases generated on the surfaces of the plates 36 and 38 pass upward through the orifice 39a into the gas passageway 40 where they are mixed with air as explained in the description of Figure 1.

A pipe 51 bent as shown in Figure 2 passes downwardly through the housing of the carburetor and has a series of spaced apertures a in its horizontal portion beneath the plates 36 and 38. An upwardly opening check valve 53 is in control of the air inlet 54. When a partial vacuum exists in the chamber 33, air is drawn in through the opening 54 and subsequently passes upwardly through the apertures a. This air tends to remove any bubbles of gas collecting on the plates 36 and 38 and also tends to cool the electrolyte. The check valve 53 automatically closes when a gas pressure exists within the carburetor and thereby prevents the electrolyte from being forced out of the opening 54.

In order to provide for alternate evolution of the gases from the plates 36 and 38, a pole changer 41 shown in Figure 3 is provided, which is actuated periodically by the motor 42 which drives the worm 43 and the gear 44 and causes oscillations of the member 45 which is connected by a spring 46 to the arm 47, thereby causing the pole changer to snap from one position to the other.

In operation, the carburetor shown in Figure 2 is connected as shown in the wiring diagram of Figure 4. A storage battery 48 or other suitable source of direct current is connected to a variable rheostat 49, switch 50, pole changer 41 and to the carburetor as shown. Thus the rate of evolution of the gases can be controlled by the setting of the rheostat 49 and the desired alternate evolution of the gases in the compartments of the carburetor is accomplished by means of the periodically operated pole changer 41.

Manifestly, the construction shown is capable of considerable modification and such modification as is considered within the scope and meaning of the appended claims is also considered within the spirit and intent of the invention.

What is claimed is:

1. An electrolytic carburetor including an anode and a cathode, float means to control the level of the electrolyte within said carburetor, means to mix the gases resulting from electrolysis with air, and a check valve independent of said float means to control ingress of air to said carburetor.

2. An electrolytic carburetor including anode and cathode plates, a float actuated valve in control of the electrolyte level within said carburetor, means to mix the gases resulting from electrolysis with air, a check valve in control of said means, a second check valve independent of said float actuated valve to prevent loss of gases from said carburetor.

3. An electrolytic carburetor for producing mixtures of hydrogen, oxygen and air, including a series of spaced and electrically connected anode plates partially immersed in the electrolyte within said carburetor, a series of electrically connected cathode plates spaced between said anode plates, a float operated valve in control of the electrolyte level within said carburetor, an air inlet to said carburetor and a check valve in control of said air inlet.

4. An electrolytic carburetor for generating hydrogen and oxygen gases from water and for mixing the said gases with air, including an anode and a cathode partially immersed in an electrolyte within said carburetor, float actuated means to replace the water consumed whereby to maintain a constant fluid level within said device, means for mixing the said gases with air, and a check valve in control of said latter means.

5. An electrolytic carburetor including an anode and a cathode, float actuated means to control the level of the electrolyte within said carburetor, means to mix the gases resulting from electrolysis with air, a check valve in control of said latter means and means to periodically reverse the direction of current through said carburetor.

CHARLES H. GARRETT.